(12) United States Patent
Li (10) Patent No.: US 11,023,766 B2
(45) Date of Patent: Jun. 1, 2021

(54) AUTOMATIC OPTICAL CHARACTER RECOGNITION (OCR) CORRECTION

(71) Applicant: Advanced New Technologies Co., Ltd., Grand Cayman (KY)

(72) Inventor: Ruoyu Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/791,936

(22) Filed: Feb. 14, 2020

(65) Prior Publication Data

US 2020/0380286 A1 Dec. 3, 2020

(30) Foreign Application Priority Data

May 28, 2019 (SG) .......................... 10201904825X (51) Int. Cl.
| | | |
|---|---|---|
| *G06K 9/62* | (2006.01) | |
| *G06K 9/46* | (2006.01) | |
| *G06N 3/08* | (2006.01) | |
| *G06N 3/04* | (2006.01) | |

(52) U.S. Cl.
CPC ............. *G06K 9/46* (2013.01); *G06K 9/6217* (2013.01); *G06N 3/0445* (2013.01); *G06N 3/08* (2013.01); *G06K 2209/01* (2013.01)

(58) Field of Classification Search
CPC .......... G06N 3/08; G06N 3/0445; G06K 9/46; G06K 9/6217
USPC ........................................................ 382/157
See application file for complete search history.

(56) References Cited

U.S. PATENT DOCUMENTS

| | | | |
|---|---|---|---|
| 9,519,641 | B2 | 12/2016 | Solntseva et al. |
| 9,990,544 | B1* | 6/2018 | Uribe ................. G06K 9/00442 |
| 2012/0185478 | A1* | 7/2012 | Topham ................ G06F 16/313 |
| | | | 707/737 |
| 2014/0355069 | A1* | 12/2014 | Caton .................. H04N 1/0087 |
| | | | 358/3.28 |
| 2017/0161264 | A1* | 6/2017 | Zhao ....................... G06F 40/58 |
| 2017/0270358 | A1* | 9/2017 | Salemizadeh ............. B07C 3/00 |

(Continued)

FOREIGN PATENT DOCUMENTS

| | | |
|---|---|---|
| CN | 107220648 | 9/2017 |
| CN | 107491730 | 12/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Stephen P Coleman
(74) *Attorney, Agent, or Firm* — Fish & Richardson P.C.

(57) ABSTRACT

Disclosed herein are computer-implemented methods, computer-implemented systems, and non-transitory, computer-readable media for automatic Optical Character Recognition (OCR) correction. One computer-implemented method includes evaluating an OCR result using a trained Long short-term memory (LSTM) neural network language model to determine whether correction to the OCR result is required. If correction to the OCR result is required, a most similar text relative to the OCR result is determined from a name and address corpus using a modified edit distance technique. The OCR result is corrected with the determined most similar text.

21 Claims, 4 Drawing Sheets

(56) References Cited

U.S. PATENT DOCUMENTS

2018/0225274 A1    8/2018  Tommy et al.
2019/0147239 A1*  5/2019  Jin .......................... G06K 9/036
                                                                             382/173
2019/0354919 A1*  11/2019  Mahboob ................. B07C 3/20

OTHER PUBLICATIONS

Nakamoto, "Bitcoin: A Peer-to-Peer Electronic Cash System," www.bitcoin.org, 2005, 9 pages.
Saluja, et al., "Error detection and corrections in Indic OCR using LSTMs," 2017 IAPR International Conference on Document Analysis and Recognition, Dec. 31, 2017, 1:17-22.

* cited by examiner

AUTOMATIC OPTICAL CHARACTER RECOGNITION (OCR) CORRECTION

CROSS-REFERENCE TO RELATED APPLICATIONS

This application claims priority to Singapore Patent Application No. 10201904825X, filed on May 28, 2019, which is hereby incorporated by reference in its entirety.

FIELD OF INVENTION

The present invention relates broadly, but not exclusively, to automatic Optical Character Recognition (OCR) correction.

BACKGROUND electronic-Know Your Customer (eKYC) is a digital due diligence process performed by a business to verify the identity of its clients and to assess potential risks of illegal intentions towards the business relationship (e.g. money laundering).

Optical character recognition (OCR) is a technique to recognize texts in physical documents and to convert them to machine-encoded texts.

When performing eKYC, OCR may be used to recognize official identity (ID) documents, e.g. ID card, passport etc. Current OCR techniques can achieve a reasonably high accuracy rate; however, errors sometimes occur. Therefore, it is useful to determine OCR results that need to be corrected and to automatically correct the results.

Automatic OCR correction may involve directly searching a name/address corpus to find the most similar name/address for correction. As the coverage rate of the corpus cannot be ensured, direct searching may result in many correct results being wrongly corrected.

SUMMARY

According to one embodiment, a language model that is trained by a constructed name/address corpus is used to determine whether an OCR result needs to be corrected. If the OCR result needs to be corrected, a modified edit distance process is used to determine the visual similarity of the texts. OCR results (corrected and non-corrected) are added to the corpus to enrich the corpus and to improve the performance of the language model and modified edit distance process.

According to another embodiment, there is provided an Optical Character Recognition (OCR) system, including: an acquisition device configured to obtain a digital image of a physical document; an image conversion device configured to convert the digital image of the physical document into corresponding machine-readable text; a correction device configured to: evaluate the machine-readable text using a trained Long short-term memory (LSTM) neural network language model to determine whether correction to the machine-readable text is required; if correction to the machine-readable text is required, determine a most similar text relative to the machine-readable text from a name and address corpus using a modified edit distance technique; and correct the machine-readable text with the determined most similar text; and an output device configured to output the corrected machine-readable text.

The OCR system may further include: a database device having stored therein a collection of names and addresses associated with a target domain, wherein the database device is configured to construct the name and address corpus based on the stored collection of names and addresses associated with the target domain; and a training device configured to train the LSTM neural network language model using the name and address corpus. The output device may be further configured to add at least the corrected machine-readable text to the collection of names and addresses stored in the database device.

The database device may be further configured to re-construct the name and address corpus based on the collection of names and addresses that comprises the corrected machine-readable text. The training device may be further configured to re-train the LSTM neural network language model using the re-constructed name and address corpus. The correction device may be further configured to evaluate a log(frequency of edit pairs in history) to determine the most similar text relative to the machine-readable text to be corrected.

According to another embodiment, there is provided a system for automatic Optical Character Recognition (OCR) correction, the system including: a processor device; and a memory device including computer program code; the memory device and the computer program code configured to, with the processor device, cause the system at least to: evaluate an OCR result using a trained Long short-term memory (LSTM) neural network language model to determine whether correction to the OCR result is required; if correction to the OCR result is required, determine a most similar text relative to the OCR result from a name and address corpus using a modified edit distance technique; and correct the OCR result with the determined most similar text.

According to another embodiment, there is provided a method for automatic Optical Character Recognition (OCR) correction, including: evaluating an OCR result using a trained Long short-term memory (LSTM) neural network language model to determine whether correction to the OCR result is required; if correction to the OCR result is required, determining a most similar text relative to the OCR result from a name and address corpus using a modified edit distance technique; and correcting the OCR result with the determined most similar text.

BRIEF DESCRIPTION OF THE DRAWINGS

Embodiments are provided by way of example only, and will be better understood and readily apparent to one of ordinary skill in the art from the following written description, read in conjunction with the drawings, in which.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Current Optical Character Recognition (OCR) techniques can achieve a high accuracy rate; however, errors sometimes occur. Therefore, embodiments seek to determine OCR results that need to be corrected and to provide a mechanism to automatically correct the results.

Names and addresses form a major part of eKYC OCR results, which tend to share the same trend respectively (i.e., names may share the same trend, and address may share the same trend). For example, people from Malaysia who are Muslims commonly have names with Mohammad or Muhammad. Accordingly, embodiments seek to provide an automatic OCR correction method based on a neural language model and modified edit distance. Neural language modelling is used to model the inner rules of names and addresses in order to find out the OCR results that need to be corrected. In particular, a language model can, given context, predict a particular word and its corresponding probability; and given a sequence, generate a score to evaluate whether a predicted output meets the inner rules. Modified edit distance is used to determine the corrected answer from a historical name and address corpus.

A statistical language model provides a probability distribution over sequences of words. Accordingly, given context, the probability distribution of a particular word can be predicted. Given such a sequence, say of length m, it is possible to assign a probability $P(w\_1, w\_2, \ldots, w\_m)$ to the whole sequence. For example, when given the context, "a cat is ( ) in the yard.", it is possible to infer the word ( ) to be "running", "sleeping" and so on, and it is possible to determine the probability for every word. At the same time, using a language model, it is possible that, e.g. "a cat is surfing in the yard", is given a low score, which means that it does not match the inner rule of a language. Names and addresses can be seen as a sequence of characters. For example, we know "Jack" is a name, and it is likely that there is an error with a name "XXYYZZ", which can be evaluated by a language model trained by a name corpus. In summary, a language model learns the probability of word occurrence based on examples of text from a text corpus (i.e. a large and structured set of text). When given a particular sentence (a sequence of words), a language model can predict a next word when given a context, or assign a score to a whole sentence when evaluating whether the sentence meets inner rules of a language.

As another example, in the context of names and addresses, "sentence"="name", "word"="character", so when given "Mari" it is possible to predict the next character to be "a" with a high confidence score. When given "Maria", it is possible to evaluate whether it is a true name. On the other hand, if a character is wrongly recognized during the OCR process, it is possible to use a language model to determine that the recognized character does not obey the rule of the corpus, like a name "Maaia".

In an exemplary embodiment, a language model that is trained by a constructed name/address corpus is used to determine whether an OCR result needs to be corrected. If the OCR result needs to be corrected, a modified edit distance process is used to determine the visual similarity of the texts. The modified edit distance process uses edit distance as a baseline, which use steps of operations (add, delete or convert a character) to evaluate a similarity between two sequences of characters, and takes visual similarity of characters into consideration. For example, converting "B" to "R" is more likely to happen than converting "B" to "Z", since the former one is relatively more visually similar. OCR results are added to the corpus to enrich the corpus and to improve the performance of the language model and modified edit distance process.

Figure 1:
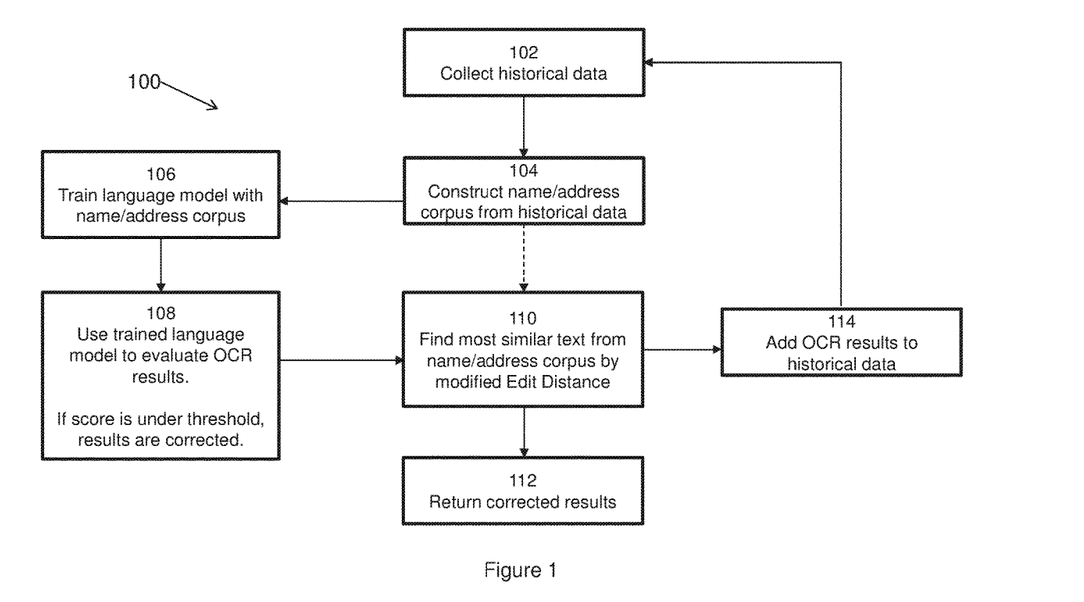
FIG. 1 is a flow chart illustrating a method for automatic Optical Character Recognition (OCR) correction, according to an embodiment.

FIG. 1 is a flow chart 100 illustrating a method for automatic Optical Character Recognition (OCR) correction, according to an embodiment.

At step 102, historical data is collected from a target domain (e.g. people from a particular country or geographical region of interest). The historical data comprises names and address associated with people from the particular country or geographical region of interest.

At step 104, a name and address corpus (library) is constructed from the historical data collected at step 102. Specifically, the name and address fields of the historical data is used to construct the name and address corpus.

At step 106, a language model is trained with the name and address corpus constructed at step 102 using a Long short-term memory (LSTM) neural network. A LSTM neural network is an artificial recurrent neural network (RNN) architecture that is used in the field of deep learning. Unlike standard feed-forward neural networks, LSTM neural networks have feedback connections for better processing of entire sequences of data, and therefore are particularly useful for training a language model. A LSTM unit generally comprises a cell, an input gate, an output gate and a forget gate. The cell remembers values over arbitrary time intervals and the three gates regulate the flow of information into and out of the cell.

At step 108, the trained language model is used to evaluate OCR results to determine an evaluation score. A relatively high score corresponds to a relatively high probability that the word meets an inner rule (which implies that there is a relatively high probability that the word is correctly recognized). OCR results are to be corrected if the evaluation score is below a pre-determined threshold.

At step 110, the most similar text is determined from the name and address corpus constructed at step 102 using Modified Edit Distance. Edit Distance is a way of quantifying how dissimilar two strings (e.g. words) are to one another by counting the minimum number of operations required to transform one string into the other. In particular, edit distance is used as a baseline. From edit distance, it is possible to convert a sequence A to a sequence B with minimum steps, and for every operation of every step, it is referred to as an edit pair. Thereafter, the visual similarity is modelled for every edit pair. The calculation of visual similarity is based on how often users historically correct the OCR results. The visual similarity can be determined by a log(frequency of edit pairs in history). For each OCR result that needs to be corrected, the name and address corpus is accessed and the most similar word is found based on the Modified Edit Distance result.

As an example, for a name "MICHAEI", the corpus has "MICHAEL" and "MICHAEM". However, the former one is chosen, although they both have the same original edit distance 1, because "L" and "I" is more visually similar than "I" and "M", therefore it is to be considered as more similar by the modified edit distance technique.

At step 112, the corrected OCR results are returned. OCR results that have been correctly recognized (i.e. non-corrected OCR results) are also returned. At step 114, the corrected (and, optionally, non-corrected) OCR results are added to the historical data in order to enrich the name and address corpus.

In one embodiment, there is provided an OCR system that includes a combination of hardware and software that is used to convert physical documents into machine-readable code/text. Hardware, including an optical scanner/image-capturing module/device and specialized circuit board is used to copy or read text on the physical documents. OCR software converts the scanned-in document image into corresponding machine-readable code/data.

Figure 2:
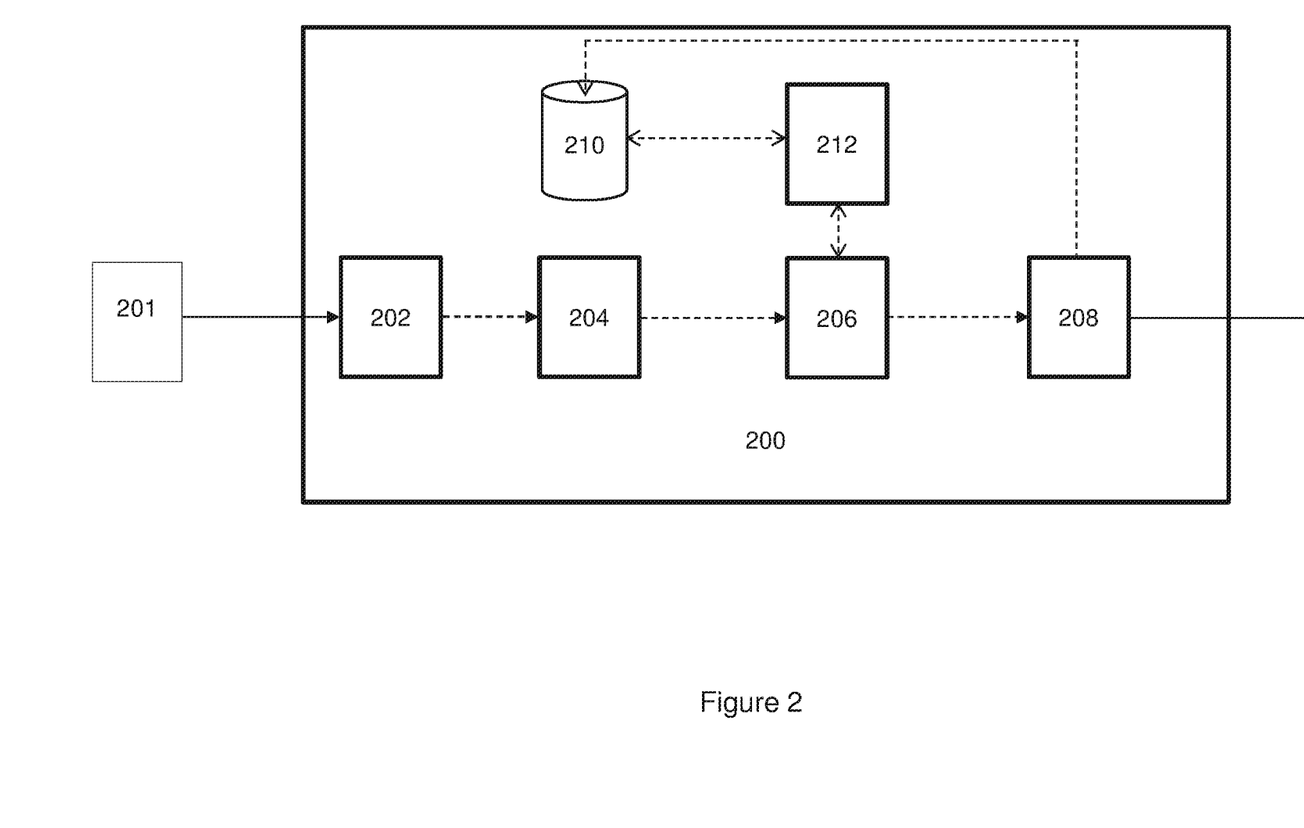
FIG. 2 is a schematic of an Optical Character Recognition (OCR) system, according to an embodiment.

FIG. 2 is a schematic of an Optical Character Recognition (OCR) system 200, according to an embodiment. The OCR system 200 includes an acquisition device 202, an image conversion device 204, a correction device 206, and an output device 208.

The acquisition device 202, which may be in the form of an optical scanner, camera, image capturing device, etc., obtains a digital image of a physical document 201. The image conversion device 204, together with suitable OCR software, converts at least a portion of the digital image of the physical document 201 into corresponding machine-readable text (or code).

The correction device 206 evaluates the machine-readable text using a trained Long short-term memory (LSTM) neural network language model to determine whether correction to the machine-readable text is required. LSTM is also considered as a bi-directional recurrent neural network with a Long short-term memory unit. If correction to the machine-readable text is required, the correction device 206 determines a most similar text relative to the machine-readable text from a name and address corpus using a modified edit distance technique. The correction device 206 may further evaluate a log(frequency of edit pairs in history) to determine the most similar text relative to the machine-readable text to be corrected. On the other hand, if correction to the machine-readable text is not required, the correction device 206 passes the machine-readable text (without any modification) to the output device 208.

The correction device 206 can further correct the machine-readable text with the determined most similar text. In other words, the erroneous machine-readable text is replaced with the determined most similar text.

The output device 208 outputs the corrected machine-readable text. For example, the output device 208 may output the corrected machine-readable text to a digital display device, a processor (not shown) for further processing or an external device.

The OCR system 200 can further include a database device 210 having stored therein a collection of names and addresses associated with a target domain (e.g. people from a particular country or geographical region of interest). The database device 210 constructs the name and address corpus based on the stored collection of names and addresses associated with the target domain.

The OCR system 200 can further include a training device 212 configured to train the LSTM neural network language model using the name and address corpus. The training device 212 can also be configured to perform pre-processes for modified edit distance. The pre-processes may include at least: (i) modelling the visual similarity for every edit pair and (ii) calculation of visual similarity based on how often users historically correct the OCR results of an edit pair, i.e. log(frequency of edit pair in history).

The output device 208 may be further configured to add the corrected machine-readable text to the collection of names and addresses stored in the database device 210. Machine-readable text that has been correctly recognized is also added to the collection of names and addresses stored in the database device 210. The database device 210 may be further configured to re-construct the name and address corpus based on the collection of names and addresses that additionally includes the corrected machine-readable text. The training device 212 may be further configured to re-train the LSTM neural network language model using the re-constructed name and address corpus. The training device 212 may also be further configured to update the modified edit distance calculations.

Figure 3:
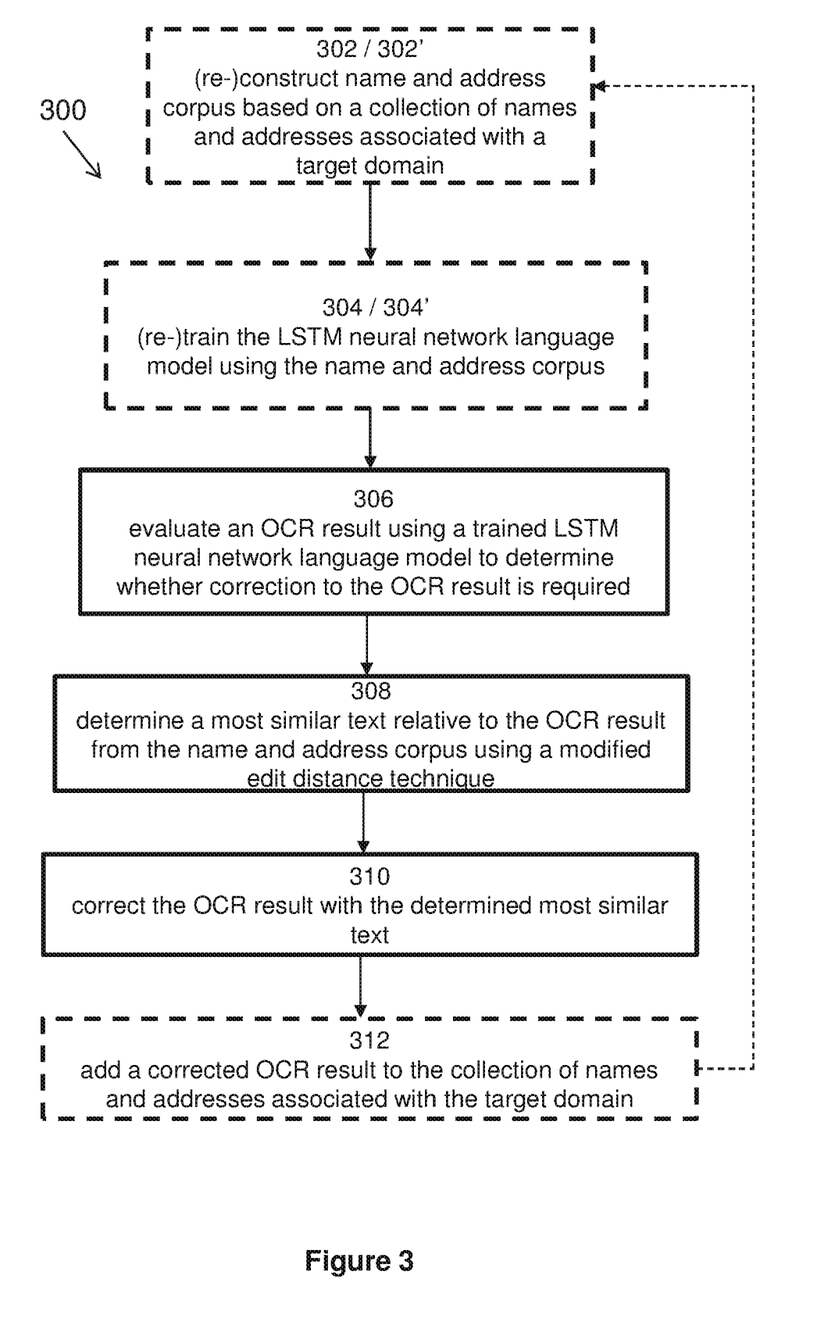
FIG. 3 is a flow chart illustrating a computer-implemented method for automatic Optical Character Recognition (OCR) correction, according to an embodiment.

FIG. 3 is a flow chart illustrating a computer-implemented method 300 for automatic Optical Character Recognition (OCR) correction, according to an embodiment. The method 300 includes the step 306 that involves evaluating an OCR result using a trained Long short-term memory (LSTM) neural network language model to determine whether correction to the OCR result is required.

If correction to the OCR result is required, the method 300 includes the step 308 that involves determining a most similar text relative to the OCR result from a name and address corpus using a modified edit distance technique. The modified edit distance technique includes evaluating a log (frequency of edit pairs in history) to determine the most similar text relative to the OCR result.

Next, step 310 involves correcting the OCR result with the determined most similar text.

Prior to steps 306, 308 and 310, the method 300 may further comprise the step 302 of constructing the name and address corpus based on a collection of names and addresses associated with a target domain (e.g. people from a particular country or geographical region of interest). Thereafter, the method 300 may further comprise the step 304 of training the LSTM neural network language model using the constructed name and address corpus.

Subsequent to step 310, the method 300 may further comprise the step 312 of adding a corrected OCR result to the collection of names and addresses associated with the target domain. OCR results that have been correctly recognized (i.e. non-corrected OCR results) are also added to the collection of names and addresses associated with the target domain.

Thereafter, the method 300 may further comprise the step 302' of re-constructing the name and address corpus based on the collection of names and addresses that further includes the corrected OCR result. In other words, step 302 is repeated with the updated collection of names and addresses that additionally includes the corrected OCR result.

Thereafter, the method 300 may further comprise the step 304' of re-training the LSTM neural network language model using the re-constructed name and address corpus. In other words, step 304 is repeated with the re-constructed name and address corpus.

The feedback mechanism associated with steps 312, 302' and 304' improves the performance of automatic OCR correction by continuously supplementing and enriching the name and address corpus with corrected results, which consequently results in better training of the LSTM neural network language model.

Figure 4:
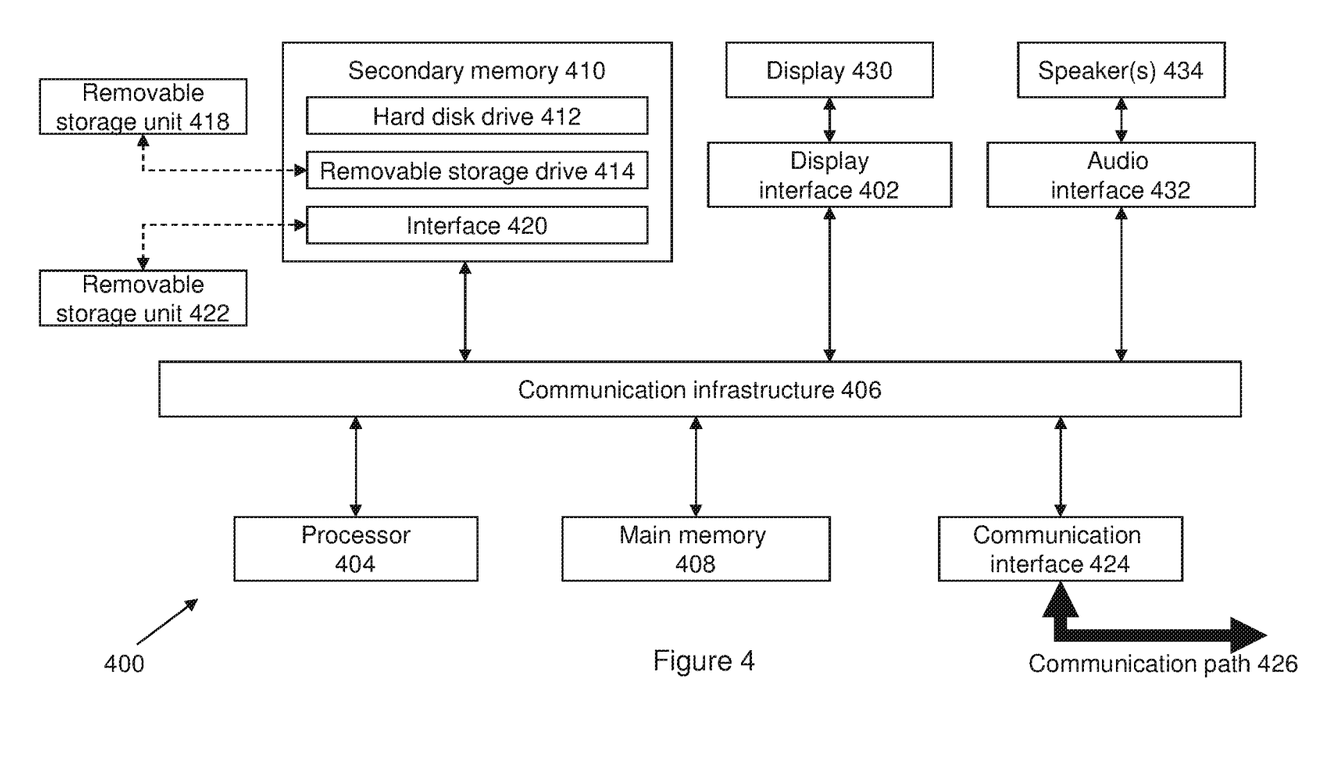
FIG. 4 shows a schematic diagram of a computer system suitable for use in executing at least some steps of the method for automatic Optical Character Recognition (OCR) correction.

FIG. 4 shows a schematic diagram of a computer system suitable for use in executing at least some steps of the above-described method for automatic Optical Character Recognition (OCR) correction.

The following description of the computer system/computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a hard disk drive 412 and/or a removable storage drive 414, which may include a magnetic tape drive, an optical disk drive, or the like. The removable storage drive 414 reads from and/or writes to a removable storage unit 418 in a well-known manner. The removable storage unit 418 may include a magnetic tape, optical disk, or the like, which is read by and written to by removable storage drive 414. As will be appreciated by persons skilled in the relevant art(s), the removable storage unit 418 includes a computer readable storage medium having stored therein computer executable program code instructions and/or data.

In an alternative embodiment, the secondary memory 410 may additionally or alternatively include other similar devices for allowing computer programs or other instructions to be loaded into the computing device 400. Such devices can include, for example, a removable storage unit 422 and an interface 420. Examples of a removable storage unit 422 and interface 420 include a removable memory chip (such as an EPROM or PROM) and associated socket, and other removable storage units 422 and interfaces 420 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments, the communication interface 424 permits data to be transferred between the computing device 400 and a data communication network, such as a public data or private data communication network. The communication interface 424 may be used to exchange data between different computing devices 400 which such computing devices 400 form part an interconnected computer network. Examples of a communication interface 424 can include a modem, a network interface (such as an Ethernet card), a communication port, an antenna with associated circuitry and the like. The communication interface 424 may be wired or may be wireless. Software and data transferred via the communication interface 424 are in the form of signals which can be electronic, electromagnetic, optical or other signals capable of being received by communication interface 424. These signals are provided to the communication interface via the communication path 426.

Optionally, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage unit 418, removable storage unit 422, a hard disk installed in hard disk drive 412, or a carrier wave carrying software over communication path 426 (wireless link or cable) to communication interface 424. Computer readable storage media refers to any non-transitory tangible storage medium that provides recorded instructions and/or data to the computing device 400 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 400. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 408 and/or secondary memory 410. Computer programs can also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the hard disk drive 412, or the interface 420. Alternatively, the computer program product may be downloaded to the computer system 400 over the communications path 426. The software, when executed by the processor 404, causes the computing device 400 to perform functions of embodiments described herein.

It is to be understood that the embodiment of FIG. 4 is presented merely by way of example. Therefore, in some embodiments one or more features of the computing device 400 may be omitted. Also, in some embodiments, one or more features of the computing device 400 may be combined together. Additionally, in some embodiments, one or more features of the computing device 400 may be split into one or more component parts.

According to one embodiment, there is provided a system for automatic Optical Character Recognition (OCR) correction. The system includes a processor device (such as the processor 404) and a memory device (such as the secondary memory 410) including computer program code. The memory device and the computer program code are configured to, with the processor device, cause the system at least to evaluate an OCR result using a trained Long short-term memory (LSTM) neural network language model to determine whether correction to the OCR result is required. If correction to the OCR result is required, the system is further caused to determine a most similar text relative to the OCR result from a name and address corpus using a modified edit distance technique.

The system is also further caused to correct the OCR result with the determined most similar text. In particular, the system can evaluate a log(frequency of edit pairs in history) to determine the most similar text relative to the OCR result. The system may be further caused to: (i) construct the name and address corpus based on a collection of names and addresses associated with a target domain; and (ii) during a training phase, train the LSTM neural network language model using the name and address corpus.

The modified edit distance pre-process may be performed during the training phase. As the "frequency of edit pair" result is obtained from historical data, the result may be determined and stored before the training phase and updated when a new corpus is ready.

To implement a feedback mechanism for improved performance, the system may be further caused to: (a) add a corrected OCR result to the collection of names and addresses associated with the target domain; (b) re-construct the name and address corpus based on the collection of names and addresses that comprises the corrected OCR result; and (c) re-train the LSTM neural network language model using the re-constructed name and address corpus.

The techniques described in this specification produce one or more technical effects. In particular, using a language model that is trained by a name and address corpus, it is possible to automatically determine texts that may be incorrect, and ignore the correct ones. The corrected results by the corpus are more robust, and the increase of the size of the corpus keeps improving the performance of automatic OCR correction.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, other methods may be applied to determine whether the OCR results need to be corrected. For example, text classification algorithms can be used to classify the results to be corrected. The confidence scores of an OCR system can also be applied to compare with a pre-determined threshold to determine whether the OCR results need to be corrected. Further, besides modified Edit Distance, other distance methods can be used to determine the most similar text from the corpus, like Jaccard Distance.

What is claimed is:

1. A computer-implemented method for automatic Optical Character Recognition (OCR) correction, comprising:

evaluating, by one or more processors, an OCR result using a trained long short-term memory (LSTM) neural network language model to determine whether correction to the OCR result is required;

in response to determining that correction to the OCR result is required, determining, by the one or more processors, a target domain of the OCR result;

retrieving, by the one or more processors, historical data corresponding to the target domain, wherein the historical data comprises past corrections of a name and an address corpus;

determining, by the one or more processors, a most similar text relative to the OCR result from the name and address corpus using a modified edit distance technique, wherein the modified edit distance technique comprises calculating a similarity between the most similar text and the OCR result based on a frequency of the past corrections; and correcting, by the one or more processors, the OCR result with the most similar text.

2. The computer-implemented method of claim 1, wherein calculating a visual similarity between the most similar text and the OCR result is performed based on evaluating a log(frequency of edit pairs in history) function, wherein edit pairs are pairs of OCR result and intermediary texts in the history data for converting to the most similar text.

3. The computer-implemented method of claim 1, further comprising:

constructing the name and address corpus based on a collection of names and addresses associated with a target domain.

4. The computer-implemented method of claim 3, further comprising:

training the LSTM neural network language model using the name and address corpus.

5. The computer-implemented method of claim 4, further comprising:
adding at least a corrected OCR result to the collection of names and addresses associated with the target domain.

6. The computer-implemented method of claim 5, further comprising:
re-constructing the name and address corpus, as a re-constructed name, based on the collection of names and addresses that comprises the corrected OCR result.

7. The computer-implemented method of claim 6, further comprising:
re-training the LSTM neural network language model using the re-constructed name and address corpus.

8. A non-transitory, computer-readable medium storing one or more instructions executable by a computer system to perform one or more operations for automatic Optical Character Recognition (OCR) correction, comprising:
evaluating, by one or more processors, an OCR result using a trained long short-term memory (LSTM) neural network language model to determine whether correction to the OCR result is required;
in response to determining that correction to the OCR result is required, determining, by the one or more processors, a target domain of the OCR result;
retrieving, by the one or more processors, historical data corresponding to the target domain, wherein the historical data comprises past corrections of a name and an address corpus;
determining, by the one or more processors, a most similar text relative to the OCR result from the name and address corpus using a modified edit distance technique, wherein the modified edit distance technique comprises calculating a similarity between the most similar text and the OCR result based on a frequency of the past corrections; and
correcting, by the one or more processors, the OCR result with the most similar text.

9. The non-transitory, computer-readable medium of claim 8, wherein calculating a visual similarity between the most similar text and the OCR result is performed based on evaluating a log(frequency of edit pairs in history) function, wherein edit pairs are pairs of OCR result and intermediary texts in the history data for converting to the most similar text.

10. The non-transitory, computer-readable medium of claim 8, further comprising one or more instructions for:
constructing the name and address corpus based on a collection of names and addresses associated with a target domain.

11. The non-transitory, computer-readable medium of claim 10, further comprising one or more instructions for:
training the LSTM neural network language model using the name and address corpus.

12. The non-transitory, computer-readable medium of claim 11, further comprising one or more instructions for:
adding at least a corrected OCR result to the collection of names and addresses associated with the target domain.

13. The non-transitory, computer-readable medium of claim 12, further comprising one or more instructions for:
re-constructing the name and address corpus, as a re-constructed name, based on the collection of names and addresses that comprises the corrected OCR result.

14. The non-transitory, computer-readable medium of claim 13, further comprising one or more instructions for:
re-training the LSTM neural network language model using the re-constructed name and address corpus.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for automatic Optical Character Recognition (OCR) correction, comprising:
evaluating, by one or more processors, an OCR result using a trained long short-term memory (LSTM) neural network language model to determine whether correction to the OCR result is required;
in response to determining that correction to the OCR result is required, determining, by the one or more processors, a target domain of the OCR result;
retrieving, by the one or more processors, historical data corresponding to the target domain, wherein the historical data comprises past corrections of a name and an address corpus;
determining, by the one or more processors, a most similar text relative to the OCR result from the name and address corpus using a modified edit distance technique, wherein the modified edit distance technique comprises calculating a similarity between the most similar text and the OCR result based on a frequency of the past corrections; and
correcting, by the one or more processors, the OCR result with the most similar text.

16. The computer-implemented system of claim 15, wherein calculating a visual similarity between the most similar text and the OCR result is performed based on evaluating a log(frequency of edit pairs in history) function, wherein edit pairs are pairs of OCR result and intermediary texts in the history data for converting to the most similar text.

17. The computer-implemented system of claim 15, further performing one or more operations comprising:
constructing the name and address corpus based on a collection of names and addresses associated with a target domain.

18. The computer-implemented system of claim 17, further performing one or more operations comprising:
training the LSTM neural network language model using the name and address corpus.

19. The computer-implemented system of claim 18, further performing one or more operations comprising:
adding at least a corrected OCR result to the collection of names and addresses associated with the target domain.

20. The computer-implemented system of claim 19, further performing one or more operations comprising:
re-constructing the name and address corpus, as a re-constructed name, based on the collection of names and addresses that comprises the corrected OCR result.

21. The computer-implemented system of claim 20, further performing one or more operations comprising:
re-training the LSTM neural network language model using the re-constructed name and address corpus.

* * * * *